No. 825,486. PATENTED JULY 10, 1906.
A. M. SAUNDERS.
APPARATUS FOR THE MANUFACTURE OF PIPE.
APPLICATION FILED JAN. 23, 1904.
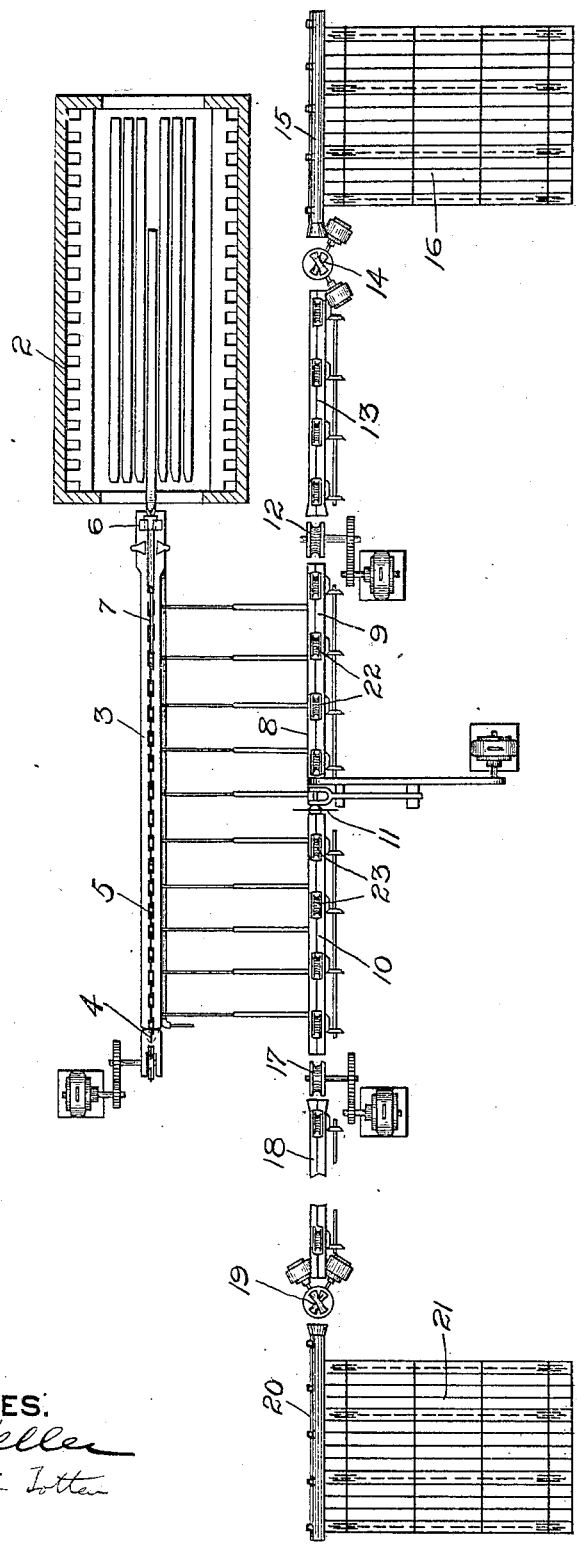
WITNESSES.
INVENTOR.

UNITED STATES PATENT OFFICE.

AUGUSTUS M. SAUNDERS, OF McKEESPORT, PENNSYLVANIA, ASSIGNOR TO NATIONAL TUBE CO., OF PITTSBURG, PENNSYLVANIA, A CORPORATION OF NEW JERSEY.

APPARATUS FOR THE MANUFACTURE OF PIPE.

No. 825,486.　　　Specification of Letters Patent.　　　Patented July 10, 1906.

Application filed January 23, 1904. Serial No. 190,328.

*To all whom it may concern:*

Be it known that I, AUGUSTUS M. SAUNDERS, a resident of McKeesport, in the county of Allegheny and State of Pennsylvania, have invented a new and useful Improvement in Apparatus for the Manufacture of Pipe; and I do hereby declare the following to be a full, clear, and exact description thereof.

My invention relates to the manufacture of butt-weld tubing, and has special reference to the manufacture of what is known as "double-length" tubing, where the tube is welded in double the ordinary standard length and is severed during finishing into the ordinary standard length of tube. Its object is to provide for the quick handling of the welded tube.

In Letters Patent to Peter Patterson, No. 715,854, of December 16, 1902, is described apparatus for the manufacture of such tubing, in which the welded double-length tube is passed into a feeding-trough and cut into sections and the sections fed successively through finishing rolls, being either cut into sections before passing through the sizing-rolls or, if cross-rolls are employed, before passing through the cross-rolls. In the manufacture of the smaller sizes of this class of tubing some difficulty has been experienced through the delay consequent to the stoppage of the blank for sawing and the subsequent feeding of the two sections along the same course to the finishing-rolls. By the present invention difficulties of this character are overcome and means provided for the quick finishing of the two sections so formed.

My invention consists, generally stated, in the combination of a receiving-trough, a lateral feed thereto, a saw adapted to cut the tube into sections, and two sets of finishing-rolls, one at each end of and in line with the receiving-trough, the rolls being driven in opposite directions and being adapted to draw the two sections cut from the double-length tube in opposite directions from the receiving-trough.

It also consists in certain other improvements, as hereinafter set forth and claimed.

To enable others skilled in the art to make and use my invention, I will describe the same more fully, referring to the accompanying drawing, which represents in plan view apparatus embodying the invention.

The furnace 2 is of any suitable construction, preferably of regenerative type, and is made of suitable length to receive the blanks of double length, being generally about forty (40) to forty-five (45) feet long. In front of the furnace in the welding apparatus 3, which may be of any suitable construction, being shown as a swinging draw-bench pivoted at the rear end 4, having mounted thereon the drawing-chain 5 and provided with a bell-holder 6 at its forward end, the welding-tongs 7 being employed to engage the blanks in the furnace and connect them to the drawing apparatus. Located at the side of the welding apparatus is the receiving-trough 8, formed in two sections 9 and 10, and mounted at the side of this trough is the saw 11, adapted to pass across the trough and sever the welded tube of double length into sections of the ordinary length of standard tubes. At each end of and in line with this receiving-trough are sets of finishing-rolls, the sizing-rolls 12 being located at the forward end of the receiving-trough section 9 and beyond the same the cross-roll trough 13, leading to the cross-rolls 14, which feed to the cooling-table trough 15, which in turn feeds to the cooling-table 16. At the opposite end of the receiving-trough and of the trough-section 10 are the sizing-rolls 17, which feed into the cross-roll trough 18, feeding to the cross-rolls 19, which in turn feed to the cooling-table trough 20, feeding to the cooling-table 21. In the receiving-trough sections 9 and 10 are suitable power-driven feeding-rolls, the feeding-rolls 22 in the trough-section 9 feeding toward sizing-rolls 12. While the feeding-rolls 23 in the trough-section 10 feed toward the sizing-rolls 17, the two sets of finishing-rolls are driven in opposite directions to each other, while their cross-roll troughs are also provided with feeding-rollers driven in proper direction for feeding from the sizing-rolls to the cross-rolls.

In employing the apparatus above described the tube-blanks in either plate or strip form or bent into U shape or tubular form are fed to the welding-furnace, preferably into the rear end thereof, and when making butt-weld tubing into final heating position, and when the edges are at welding heat the blanks are grasped by the welding-tongs, the welding-bell thrown over the same, the tongs connected to the drawing apparatus, and the blank drawn through the bell, which is held in the bell-holder, and thereby welded into tubing. The welded tube then passes over the connecting-skids or other suitable transfer device into the receiving-trough 8, when it is immediately severed into two tube-sections by the saw 11, and the two tube-sections resting on the feed-rollers in the troughs 9 and 10 are by means of the same fed in opposite directions away from the saw and into the respective finishing-rolls—that is, the forward section, resting in the trough-section 9, is fed into the sizing-rolls 12 and to the cross-roll trough 13 through the cross-rolls 14 and into the cooling-table trough 15, from which it is fed onto the cooling-table 16. At the same time the other tube-section in the trough-section 10 is fed forward from the sizing-rolls 17 into the cross-roll trough 18 and thence from the cross-rolls 19 to the cooling-table trough 20, from which it passes onto the cooling-table 21. The feeding-rolls in the receiving-trough 11, as well as those in the cross-roll troughs, can be arranged to be continuously driven, so that the instant the tube is severed by the saw into two sections the respective sections will pass in opposite directions away from the saw and into and through the finishing-rolls. In this way the tubing can be very rapidly handled, and danger of clogging the plant or of delay in finishing the tubes is largely overcome.

What I claim is—

1. In apparatus for the manufacture of double-length tubing, the combination of a receiving-trough, a lateral feed thereto, a saw adapted to cut the tube into sections, and two sets of finishing-rolls, one at each end of and in line with the receiving-trough, the rolls being driven in opposite directions and adapted to draw the two sections cut from the double-length tube in opposite directions from the receiving-trough.

2. In apparatus for the manufacture of double-length tubing, the combination of a welding-furnace, welding apparatus in front thereof, a receiving-trough at the side of the welding apparatus, a lateral feed to said trough, a saw adapted to cut the tube into sections, two sets of finishing-rolls one at each end of and in line with the receiving-trough, the rolls being driven in opposite directions and being adapted to draw the two sections cut from the double-length tube in opposite directions from the trough.

3. In apparatus for the manufacture of double-length tubing, the combination of a receiving-trough, a lateral feed thereto, a saw adapted to cut the tube into sections, two sets of finishing-rolls, one at each end of and in line with the receiving-trough, the rolls being driven in opposite directions, and power-driven feed-rollers in the trough driven in opposite directions and adapted to feed the two sections in opposite directions from the trough into the finishing-rolls.

In testimony whereof I, the said AUGUSTUS M. SAUNDERS, have hereunto set my hand.

AUGUSTUS M. SAUNDERS.

Witnesses:
JAMES I. KAY,
ROBERT C. TOTTEN.